N. WILKINSON.
RESISTANCE GRID.
APPLICATION FILED APR. 8, 1911.
1,088,003.
Patented Feb. 24, 1914.
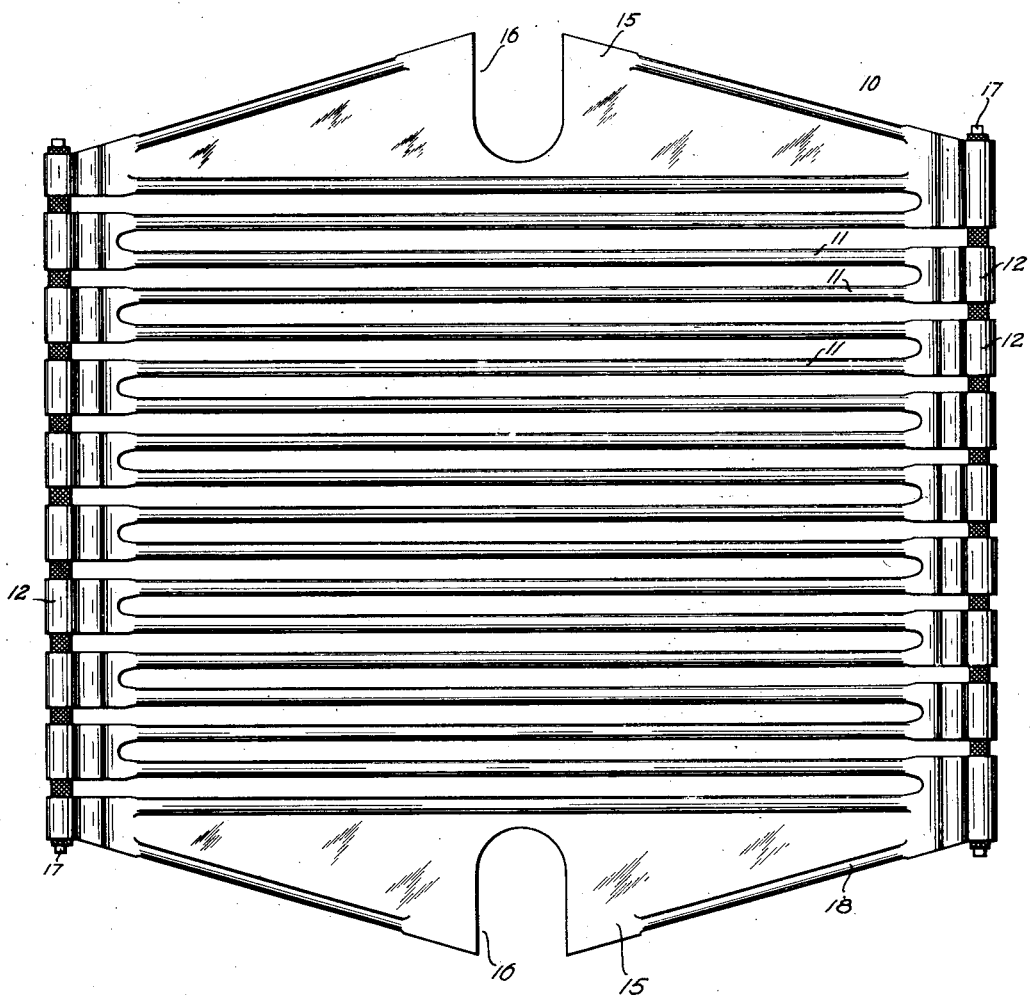
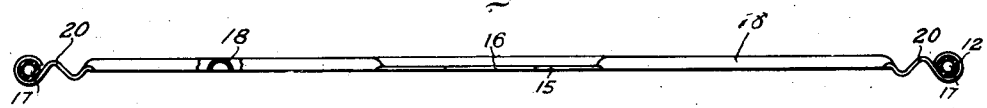

UNITED STATES PATENT OFFICE.

NATHAN WILKINSON, OF MILWAUKEE, WISCONSIN, ASSIGNOR, BY MESNE ASSIGNMENTS, TO ALLIS-CHALMERS MANUFACTURING COMPANY, A CORPORATION OF DELAWARE.

RESISTANCE-GRID.

1,088,003.      Specification of Letters Patent.      Patented Feb. 24, 1914.

Application filed April 8, 1911. Serial No. 619,670.

*To all whom it may concern:*

Be it known that I, NATHAN WILKINSON, a citizen of the United States, residing at Milwaukee, in the county of Milwaukee and State of Wisconsin, have invented certain new and useful Improvements in Resistance-Grids, of which the following is a full, clear, and exact specification.

My invention relates to the construction of resistances for use in electric circuits.

Among the objects of my invention are to obtain strength, durability, compactness, and cheapness of construction.

In addition to providing a resistance possessing superior structural features, the arrangement is such that the parts may all be readily assembled and firmly held in a permanent or fixed position, except those parts intentionally made movable.

In this construction, grids are so formed and assembled that one or more of the grids comprising the resistance, can be taken out and replaced in case of breakage or injury without much trouble.

Conspicuous among the feautres of improvement is a structure of sheet metal the elements of which are made especially stiff to meet the requirements of any service for which they are intended and to which they may be subjected.

The various novel features of my invention will be described in the specification and particularly set forth in the appended claims.

The invention is illustrated on the accompanying sheet of drawings, in which—

Figure 1 is a side elevation of a grid embodying my invention; and Fig. 2 is an end elevation of the grid shown in Fig. 1.

Resistance grids have been made very heavy and bulky in structure in order to withstand jars and tendencies to warp out of shape when excessively heated. The resistance grid shown in these drawings is made light in structure. This grid is made of suitable resistance material, preferably of sheet metal punched in zig-zag form, for example, substantially as shown in Fig. 1, so as to reduce into comparatively small space a resistance of great length.

The resistance grid consists of a conductor 10 formed substantially as shown and having its elements, such as 11, parallel and connected to form a number of end turns, such as 12, the conductor terminating in enlarged ends or plates 15 provided with openings 16. These openings are adapted to receive the insulated cross rods or bolts of the suspending frame and the number of grids may be varied according to the desired length of the suspending frame. The end turns are shown as rolled or bent around insulated rods 17 to reinforce the grid structure.

The grid is made of comparatively thin material which, under ordinary circumstances, would be unable to withstand the effects of heating and jarring. The elements of the conductor comprising the grid would warp under comparatively little strain and short-circuit sections or portions of the grid were it not for the fact that these elements were stiffened. In order to render stiff the elements of the conductor comprising the grid, said elements are flexed transversely, giving said elements the strengthened effect of columns or hollow cylinders. These elements are preferably curved with respect to the plane of the grid. The end turns of the conductors are also flexed or corrugated, as shown at 20, the flexure of the end turns extending at an angle relatively to the elements to provide for the expansion of the grid when the same has become heated. The end portions 15 of the conductor 10 are stiffened by grooving said portions on one side to form ribs 18 on the other side thereof. By means of this stiffening and reinforcing, it is possible to use grids which are comparatively frail in structure without having their elements warp to such an extent when excessively heated as to buckle up or come in contact with each other or portions of the adjacent grids.

There may be many modifications in the precise form and arrangement herein shown and described, and I aim to cover all such modifications which do not involve a departure from the spirit and scope of my invention as set forth in the appended claims.

What I claim as new is:

1. A resistance grid comprising a single conductor having end turns provided with flexible corrugations and with portions bent over in the same direction and in alinement, and reinforcing members located in the bent over portions of said end turns.

2. A resistance grid comprising a single conductor consisting of a plurality of elements, each element being bent over in cross-section, and end turns uniting adjacent elements, said end turns being provided with flexible corrugations adjacent said elements, and with portions bent over in alinement to receive a reinforcing member.

3. A resistance grid comprising a single conductor consisting of a plurality of elements, each element being curved throughout its full cross-section, end turns uniting adjacent elements and provided with portions bent over in the same direction and disposed in alinement, and a reinforcing member held in said bent over portions.

4. A resistance grid comprising a plurality of parallel elements, each of said elements being provided with bent over strengthening ribs, portions uniting adjacent elements at the ends thereof, said portions being provided with flexible corrugations and with parts bent over in the same plane, and a strengthening member held in said bent over parts.

5. A resistance grid comprising a conducting element consisting of a plurality of sections, and portions uniting adjacent sections at the ends thereof, said portions being provided with flexible corrugations and with bent over parts, and a strengthening member held in said bent over parts.

6. A resistance grid comprising a conducting element consisting of a plurality of sections, each section having an end connection to an adjacent section, a reinforcing member, and means secured to adjacent sections for holding said reinforcing member, said holding means being connected to said sections through portions provided with flexible corrugations.

In testimony whereof I affix my signature, in the presence of two witnesses.

NATHAN WILKINSON.

Witnesses:
CHAS. L. BYRON,
ROB. E. STOLL.